(No Model.)
S. V. BEAL.
BED PAN.
No. 330,548. Patented Nov. 17, 1885.
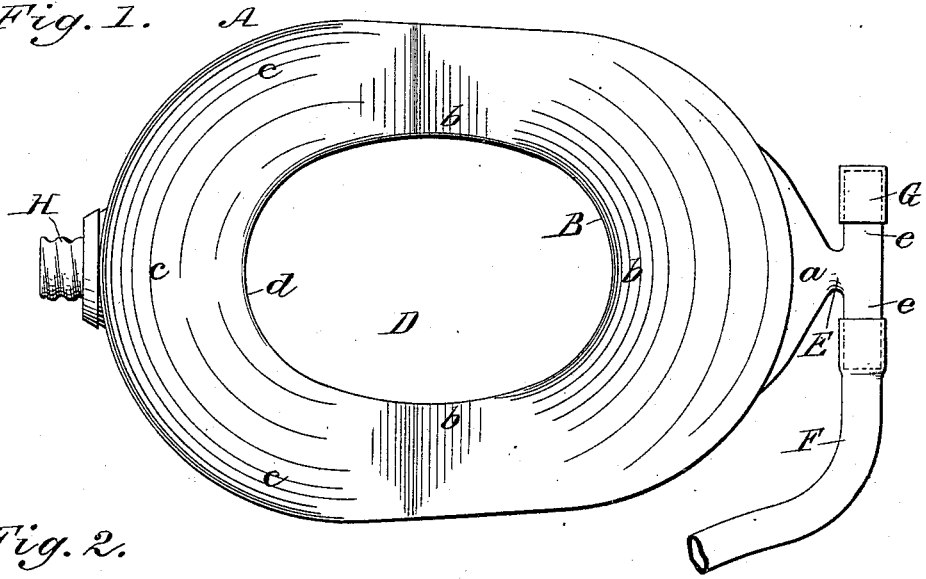
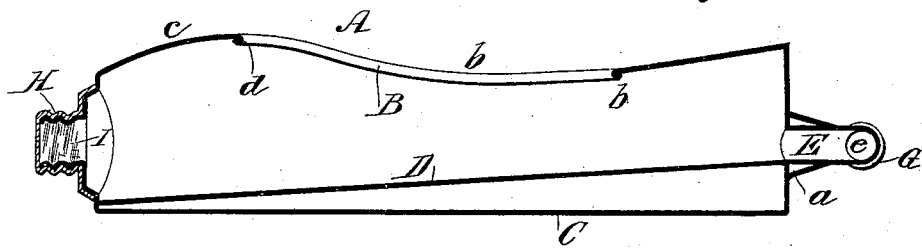
WITNESSES:
INVENTOR:
S. V. Beal
BY Munn & Co.
ATTORNEYS.

UNITED STATES PATENT OFFICE.

SARAH VINCENT BEAL, OF ANN ARBOR, MICHIGAN.

BED-PAN.

SPECIFICATION forming part of Letters Patent No. 330,548, dated November 17, 1885.

Application filed May 23, 1884. Serial No. 132,533. (No model.)

*To all whom it may concern:*

Be it known that I, SARAH VINCENT BEAL, of Ann Arbor, in the county of Washtenaw and State of Michigan, have invented a new and Improved Bed-Pan, of which the following is a full, clear, and exact description.

The object of my invention is to provide a bed-pan which may be used without soiling the bedding, and is arranged for continual discharge of its contents, irrespective of the sinking of the pan into the bedding by the weight of the patient.

The invention consists in a special shape of the top of the pan, with its inner portion inclined downward toward the central opening, and its outer portion curved outward and downward from the opening.

The invention consists, also, in a bed-pan having an outer bottom or base, and a true bottom above the base, together with a discharge-pipe fitted about on a level with the true bottom, and having branch pipes projecting laterally, to discharge the contents of the pan at either side of the bed through a connecting flexible tube.

The invention consists, also, in particular constructions and combinations of parts of the pan, all as hereinafter fully described and claimed.

Reference is to be had to the accompanying drawings, forming part of this specification, in which similar letters of reference indicate corresponding parts in both the figures.

Figure 1 is a plan view of my improved bed-pan, and Fig. 2 is a central longitudinal sectional elevation of the same.

I make the bed-pan A in the oval or oblong shape represented in Fig. 1, and about of the usual depth. The top or seat of the pan has an oval opening, as at B, located about in the center of the pan, and around the opening at the rear or inner end of the pan the top is concaved or inclined downward toward the opening B, from about the center of the top, and between the points marked $b$, at either side and one end of the opening. This concavity or incline of the top drains any liquid accidentally passing upon the top of the pan back into the pan through the opening B, and prevents soiling of the bed-clothes by escape thereon of the discharges from the patient. At the front or outer part of the pan its top is convexed or curved downward from the opening B to the outer margin of the pan, as shown at $c$, which permits the top at the end $d$ of the opening B to be made higher for the convenience of the patient, and the downward curve at $c$ makes the top easier to the body or limbs of the patient.

I make the pan A with a double bottom—an outer one, C, which supports the pan on the bed, and an inner one, D, which latter is fitted liquid-tight to the side and end walls of the pan, and is the bottom proper of the pan. At the inner end of the pan I fit the discharge-pipe E with suitable brace-plates, $a$, which pipe opens into the pan just above the bottom D and has branches $e$ $e$, extending laterally toward either side of the bed, so that the discharges may be conducted from the pan through a flexible hose or pipe, F, connected to either one of the branch pipes $e$ and to either side of the bed, as may be most convenient. A loose but liquid-tight cap, G, is fitted on the pipe $e$ opposite that end to which the pipe F is connected, or a cap, G, may be placed on both branch pipes $e$, should the pipe F not be used, as may sometimes be desired. At the outer end of the pan a screw or other suitable removable cap or plug, H, is provided to cover or close an opening, I, in the pan, through which opening the contents of the pan may be discharged. Said opening I also facilitates the thorough and easy cleaning of the pan after use.

It will be noticed that by raising the bottom D of the pan above its rest or base C the pan will be prevented from sinking into the bedding by the weight of the patient to such an extent as would prevent a free discharge of the contents through the pipes E F. In other words, the patient's weight may depress the pan into the bedding to the level of the true bottom D at the pipe E without obstructing the free discharge of the entire contents of the pan from said pipe, and this I consider an important and valuable feature of my invention, as it permits a complete quiet rest of the patient on the pan during operation upon the genital organs requiring a considerable use of washing-liquids, which may have a constant free discharge from the pan, which thus is made specially serviceable as a douche-pan to discharge liquids used on or in the parts of the patient. My improved pan thus not only avoids soiling of the bedding and facilitates by its free discharge the operations on the patient, but relieves the attending nurses from much of the heavy labor of lifting the patient now required in using other pans.

I propose to shape the top plate and side edges or walls of the pan of a single piece of sheet metal, to give a smooth inside and outside finish to the pan to facilitate cleaning it and avoid injury to the patient by sharp corners of the metal; or the pan may be molded in clay, porcelain, or other suitable material.

Having thus described my invention, I claim as new and desire to secure by Letters Patent—

1. A bed-pan having its top plate or seat inclined downward toward the opening B at its inner end, and curved outwardly and downwardly at its outer end, substantially as shown and described.

2. A bed-pan provided with an outer bottom or base, C, a true bottom, D, and a discharge-pipe, E, fitted about at the level of said bottom D, substantially as shown and described.

3. As a new article of manufacture, a bed-pan having its top plate inclined downward toward the opening B at its inner end, and curved downwardly at its outer end, and said pan having an outer bottom or base, C, a true bottom, D, and a discharge-pipe, E, having branch-pipes *e e*, substantially as shown and described.

SARAH VINCENT BEAL.

Witnesses:
WM. W. WHEDON,
ANDREW CLIMIE.